(12) United States Patent
Kraft et al.

(10) Patent No.: US 9,287,687 B2
(45) Date of Patent: Mar. 15, 2016

(54) ELECTRICAL LOW-VOLTAGE SWITCHGEAR ASSEMBLY

(75) Inventors: Klaus Kraft, Heidelberg (DE); Hans-Peter Merkel, Schriesheim (DE)

(73) Assignee: ABB PATENT GMBH, Ladenburg (DE)

( * ) Notice: Subject to any disclaimer, the term of this patent is extended or adjusted under 35 U.S.C. 154(b) by 221 days.

(21) Appl. No.: 11/887,899

(22) PCT Filed: Mar. 25, 2006

(86) PCT No.: PCT/EP2006/002762
§ 371 (c)(1),
(2), (4) Date: Oct. 4, 2007

(87) PCT Pub. No.: WO2006/105879
PCT Pub. Date: Oct. 12, 2006

(65) Prior Publication Data
US 2009/0009932 A1      Jan. 8, 2009

(30) Foreign Application Priority Data
Apr. 7, 2005   (DE) .................. 10 2005 015 944

(51) Int. Cl.
*H02B 7/00* (2006.01)
*H02B 11/127* (2006.01)
*H02B 1/21* (2006.01)
*H02B 1/36* (2006.01)

(52) U.S. Cl.
CPC ... *H02B 1/21* (2013.01); *H02B 1/36* (2013.01)

(58) Field of Classification Search
CPC ..................................... H02B 1/36; H02B 1/21
USPC ............................................ 361/605, 611
See application file for complete search history.

(56) References Cited

U.S. PATENT DOCUMENTS

| | | | | |
|---|---|---|---|---|
| 3,256,479 | A | * | 6/1966 | Edwards ...................... 324/323 |
| 3,303,395 | A | | 2/1967 | Eck |
| 3,483,433 | A | * | 12/1969 | Otteson et al. ................ 361/716 |
| 3,626,253 | A | * | 12/1971 | Sturdivan ..................... 361/608 |
| 4,180,845 | A | | 12/1979 | Shariff et al. |
| 4,249,227 | A | * | 2/1981 | Kato et al. .................... 361/622 |
| 4,342,002 | A | * | 7/1982 | Gabr .............................. 330/65 |
| 4,486,815 | A | * | 12/1984 | Takahashi ..................... 361/617 |
| 4,760,220 | A | * | 7/1988 | Fritsch et al. ............. 200/50.11 |
| 4,774,629 | A | * | 9/1988 | Stanfield et al. ............. 361/627 |

(Continued)

FOREIGN PATENT DOCUMENTS

| | | |
|---|---|---|
| DE | 91 16 243.2 U1 | 6/1992 |
| DE | 92 04 389.5 U1 | 9/1993 |

(Continued)

OTHER PUBLICATIONS

International Search Report.
German Search Report.

*Primary Examiner* — Anatoly Vortman
(74) *Attorney, Agent, or Firm* — Buchanan Ingersoll & Rooney PC

(57) ABSTRACT

The invention relates to an electrical low-voltage switchgear, comprising at least two power units accommodated in slide-in units or in a housing, and comprising control units assigned to the power units. The control units are spatially separated from the power units and power levers and are connected to one another via signal lines.

5 Claims, 2 Drawing Sheets

(56) References Cited

U.S. PATENT DOCUMENTS

| | | | |
|---|---|---|---|
| 5,159,534 A * | 10/1992 | Hudson et al. | 361/730 |
| 5,471,099 A * | 11/1995 | Larabell et al. | 307/53 |
| 5,497,287 A * | 3/1996 | Yee et al. | 361/617 |
| 5,510,960 A * | 4/1996 | Rosen | 361/823 |
| 5,515,236 A * | 5/1996 | Nolan et al. | 361/652 |
| 6,215,654 B1 | 4/2001 | Wilkie, II et al. | |
| 6,937,461 B1 * | 8/2005 | Donahue, IV | 361/622 |
| 7,139,170 B2 * | 11/2006 | Chikusa et al. | 361/695 |
| 2002/0021548 A1 * | 2/2002 | Muse et al. | 361/641 |
| 2004/0149446 A1 * | 8/2004 | Appleford et al. | 166/366 |
| 2005/0075808 A1 * | 4/2005 | Jensen et al. | 702/64 |

FOREIGN PATENT DOCUMENTS

| | | | | |
|---|---|---|---|---|
| DE | 297 04 305 U1 | 6/1997 | | |
| DE | 200 14 879 U1 | 12/2000 | | |
| DE | 103 02 485 A1 | 9/2004 | | |
| DE | 103 15 623 A1 | 10/2004 | | |
| DE | 103 15 646 A1 | 11/2004 | | |
| DE | 103 15 730 A1 | 11/2004 | | |
| DE | 103 49 906 A1 | 5/2005 | | |
| EP | 0 678 951 A1 | 10/1995 | | |
| FR | 2 832 561 A1 | 5/2003 | | |
| GB | 2379345 A * | 3/2003 | | H02M 1/08 |

* cited by examiner

ELECTRICAL LOW-VOLTAGE SWITCHGEAR ASSEMBLY

FIELD

The invention relates to an electrical low-voltage switchgear assembly in accordance with the precharacterizing clause of claim 1.

BACKGROUND

Electrical low-voltage switchgear assemblies comprise so-called power parts or power units and control units, of which the power units comprise switching devices, motor circuit breakers, contactors and the like, and control units, which are used for driving the power units and furthermore have control, measurement and protective functions for the power units.

In the known switchgear assemblies, the control units and power units are accommodated in a single area, i.e. a common housing or module, for example in a withdrawable part or insert.

If, owing to a fault, the problem is presented of replacing a power unit, at the same time the associated control unit, which is accommodated with the power unit in one area, also needs to be replaced.

SUMMARY

The object of the invention is to provide an electrical switchgear assembly of the type mentioned at the outset with which replaceability is simplified.

This object is achieved by the features of the exemplary embodiments disclosed herein.

According to the invention, the control units are therefore physically isolated from the power units and power cables and are connected to one another via signal lines.

This physical isolation means, on the one hand, that a control unit and/or a power unit can be replaced independently of one another. This is achieved in particular by virtue of the fact that the power units and the control units are each accommodated in dedicated areas.

The control units are connected to the associated power units by signal lines, which are preferably in the form of bus lines. This bus line brings about the independence of the two; an association with the corresponding power part is brought about exclusively by the software in the control unit.

Such control units are known, for example, from DE 103 49 906 or DE 103 15 623.

The access to the control units is ensured by a cabinet door, which protects the control units from unauthorized access.

In accordance with a particularly advantageous configuration, the power units can be divided from the control units by a partition wall, with the result that when a power unit has a fault, the door to the control unit area can remain open.

The use of a bus line as the signal line has the further advantage that the power units and the control units can be developed further independently of one another, which means that the two can be adapted to meet further requirements or improved independently of one another. The use of signal lines which are not in the form of bus lines is possible in principle.

The control units, which are installed at certain points associated with their power units, then also check themselves whether they have been inserted at the correct point, as is described in DE 103 15 730 or DE 103 15 646. If the control unit has been installed at an inappropriate point, fault signaling takes place within a fault routine.

Further advantageous configurations and improvements are described in the exemplary embodiments of the present disclosure.

DESCRIPTION OF THE DRAWINGS

The invention as well as further advantageous configurations and improvements of the invention and further advantages will be explained and described in more detail with reference to the drawing, which schematically illustrates an exemplary embodiment of the invention and in which:

FIG. 1 shows a switchgear assembly 10, which has a central region 11, which has, in its upper section facing the cover wall 12, an area in which a central data interface 13 is located.

Figure 1:
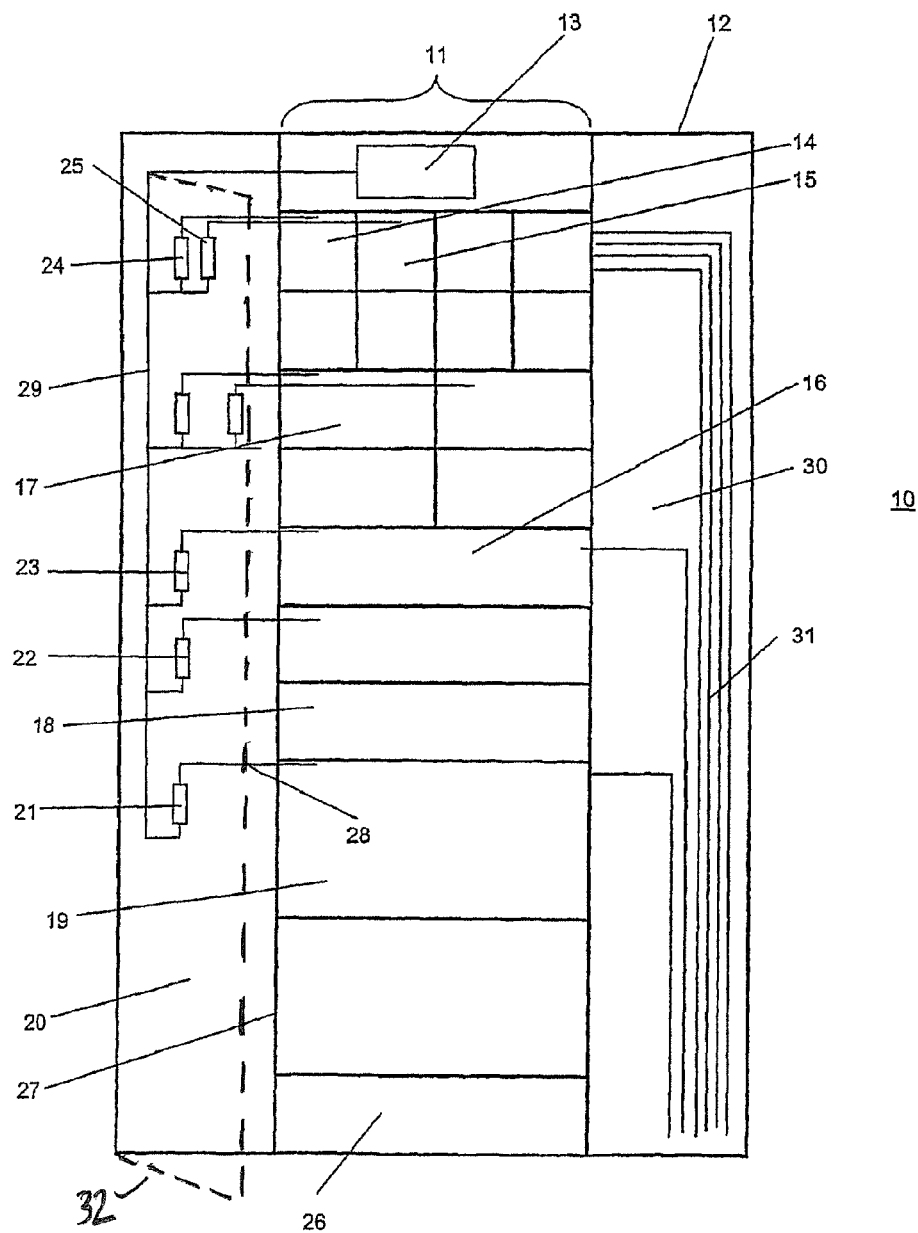
FIG. 1 shows a plan view of a low-voltage switchgear assembly.

Located in the region beneath the central data interface 13 is a power part with compartments for power units 14, 15, 16, 17, 18 and 19. These power units 14 to 19 are accommodated in withdrawable parts, the power units 14 and 15 having a first physical size, the power unit 17 a second size, the power unit 18 a third size and the power units 16 and 19 a fourth and fifth size, respectively.

In the embodiment in FIG. 1, a vertically running area 20, in which control units 21, 22, 23, 24 and 25 are accommodated, is located adjacent to the power section 11 but isolated therefrom. In this case, as many control units are provided as there are power units. An area 26 is provided in the base region of the power section 11 which is used, for example, for cooling by means of convection. The area 20 is isolated from the power section 11 by a partition wall 27, with the result that, if damage occurs in a power unit 16, the control area 20 is not influenced, with the result that, for example, the door 32 which closes the control area 20 can remain open.

As mentioned above, the control units are described in the above-cited patent applications.

The control units are connected to the power units by signal lines in the form of bus lines 28; in this case, only the connection between the control unit 21 and the power unit 19 is provided with a reference numeral.

As can be seen in FIG. 1, the power units and control units are accommodated in isolated functional areas. Owing to the configuration according to the invention, the power units and control units are functionally independent of one another and can also be replaced functionally independently of one another. In this case, the control units check the electrical data of the associated power units and monitor, by means of a data comparison, the actual installation location with the switchpanel configuration provided, i.e. they monitor whether they have been installed correctly in the correct location.

The control units in the process store up-to-date parameters and data of the power units, even in the event of a voltage failure.

The data of the control units 21, 22, 23, 24 and 25 are transmitted via a signal line 29, which is connected to the individual control units, to the central data interface 13, where they are buffer-stored. If a control unit, for example the control unit 21, is now intended to be replaced by a so-called virgin control unit, the data belonging to the old control unit are "newly" fed from the data interface 13, via the signal line 29, to the control unit 21, with the result that the control unit 21 is "newly" parameterized and updated.

Figure 2:
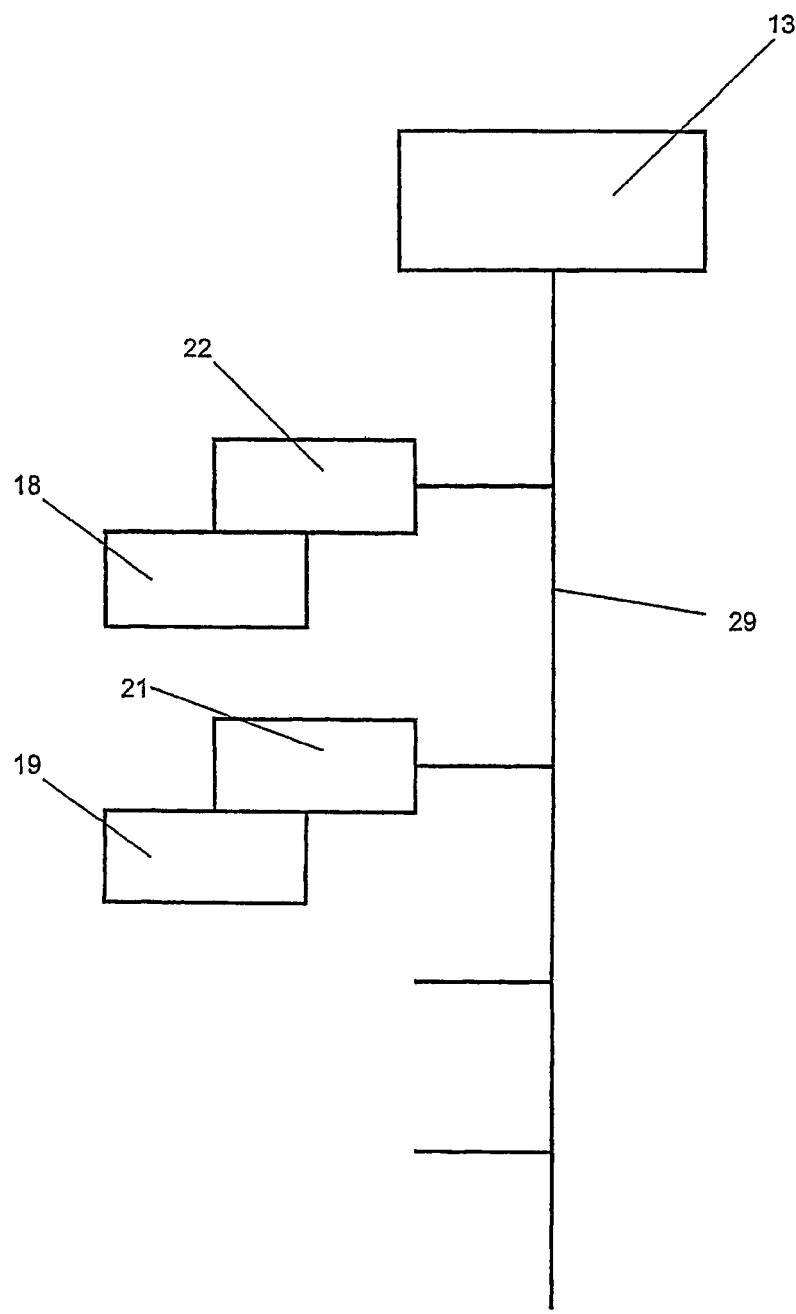
FIG. 2 shows a circuit arrangement for illustrating the assignment of the power units and control units.

FIG. 2 shows the assignment of the control unit to the power unit. For example, the control unit 22 is illustrated as being connected to the power unit 18 and the control unit 21 as being connected to the power unit 19. The output signals of the control units 22, 21 are transmitted onto the data line 29, from where they are transmitted to the central data interface 13.

The power supply to the power units takes place via power cables 31 laid in a power cable area 30. The power cable area 30 is located on that side of the central region 11 which is opposite the control unit area.

The invention claimed is:

1. An electrical low-voltage switchgear assembly, comprising:
   a plurality of housings;
   a central data interface located in a first housing;
   a plurality of power units, each power unit being located in a second housing; and
   a plurality of control units, each control unit being associated with one of the power units and is configured to store up-to-date parameters and electrical data of the associated power unit,
   wherein each control unit is connected between one of the power units and the central data interface via signal lines, and the control units, the central data interface, and the power units are physically isolated from one another,
   wherein the power units and the control units are functionally independent of one another and are configured to be replaced independently of one another,
   wherein the control units are accommodated in a vertically running control area, which is located adjacent to a power section that includes the power units,
   wherein the control area is isolated from the power section by a vertical partition wall so that the control area is not influenced if damage occurs, and
   wherein the control area is protected against mechanical access by a separate cabinet door, which protects the control units from unauthorized access, and access to the control units is safely isolated from the power units.

2. The electrical low-voltage switchgear assembly as claimed in claim 1, wherein each control unit is configured to analyze the parameters and electrical data of the associated power unit.

3. The electrical low-voltage switchgear assembly as claimed in claim 2, wherein each control unit compares the electrical data of the associated power unit with switchgear configuration data.

4. The electrical low-voltage switchgear assembly as claimed in claim 3, wherein each control unit is configured to determine whether the associated power unit is properly installed and in a proper location based on a comparison result.

5. The electrical low-voltage switchgear assembly as claimed in claim 1, wherein one of the control units is a current control unit, and wherein the central data interface is configured to install the parameters and electrical data obtained by a current control unit into a new control unit that replaces the current control unit.

* * * * *